US011772924B2

United States Patent
Rossenbach

(10) Patent No.: US 11,772,924 B2
(45) Date of Patent: Oct. 3, 2023

(54) SPREADER ROLL

(71) Applicant: KAMPF SCHNEID-UND WICKELTECH-NIK GMBH & CO. KG, Wiehl (DE)

(72) Inventor: Andreas Rossenbach, Morsbach (DE)

(73) Assignee: KAMPF SCHNEID-UND WICKELTECHNIK GMBH & CO. KG, Wiehl (DE)

( * ) Notice: Subject to any disclaimer, the term of this patent is extended or adjusted under 35 U.S.C. 154(b) by 96 days.

(21) Appl. No.: 17/264,017

(22) PCT Filed: Oct. 31, 2019

(86) PCT No.: PCT/EP2019/079870
§ 371 (c)(1),
(2) Date: Jan. 28, 2021

(87) PCT Pub. No.: WO2020/089414
PCT Pub. Date: May 7, 2020

(65) Prior Publication Data
US 2021/0292121 A1 Sep. 23, 2021

(30) Foreign Application Priority Data
Oct. 31, 2018 (DE) .......................... 102018127250.2

(51) Int. Cl.
B65H 23/025 (2006.01)
F16C 23/08 (2006.01)
(52) U.S. Cl.
CPC .......... B65H 23/0258 (2013.01); F16C 23/08 (2013.01)

(58) Field of Classification Search
CPC . B65H 23/0251; B65H 23/0258; D06C 3/067
See application file for complete search history.

(56) References Cited

U.S. PATENT DOCUMENTS

| 3,604,087 | A | | 9/1971 | Beck |
| 3,745,625 | A | * | 7/1973 | Jaegers ..................... D21F 1/40 493/406 |
| 4,470,183 | A | | 9/1984 | Kuosa |
| 2006/0183613 | A1 | | 8/2006 | Niemeyer |

FOREIGN PATENT DOCUMENTS

| DE | 19601844 A | 7/1997 | |
| DE | 19927897 A1 * | 12/2000 | ............. B65G 39/02 |
| DE | 10341119 A | 3/2005 | |

OTHER PUBLICATIONS

Machine Translation of DE 199 27 897 A1, Dec. 21, 2000. (Year: 2000).*

* cited by examiner

*Primary Examiner* — William E Dondero
(74) *Attorney, Agent, or Firm* — Andrew Wilford

(57) ABSTRACT

The invention relates to a device, comprising: a spreader roll (2), the spreader roll having a roll tube (3), over which a material web is guided, the bending of the spreader roll (2) about its longitudinal axis allowing the material web to be spread out; and two bearing journals (4), which are operatively connected to the roll tube (3) and are pivotably articulated in a machine frame (1), the bearing journals (4) being mounted on the machine frame (1) by means of pivotable bearings (6) and the bearing journals having longitudinal pins (5) protruding beyond the bearings (6), at the ends of which longitudinal pins radially acting adjustment means (7) are positioned.

9 Claims, 2 Drawing Sheets

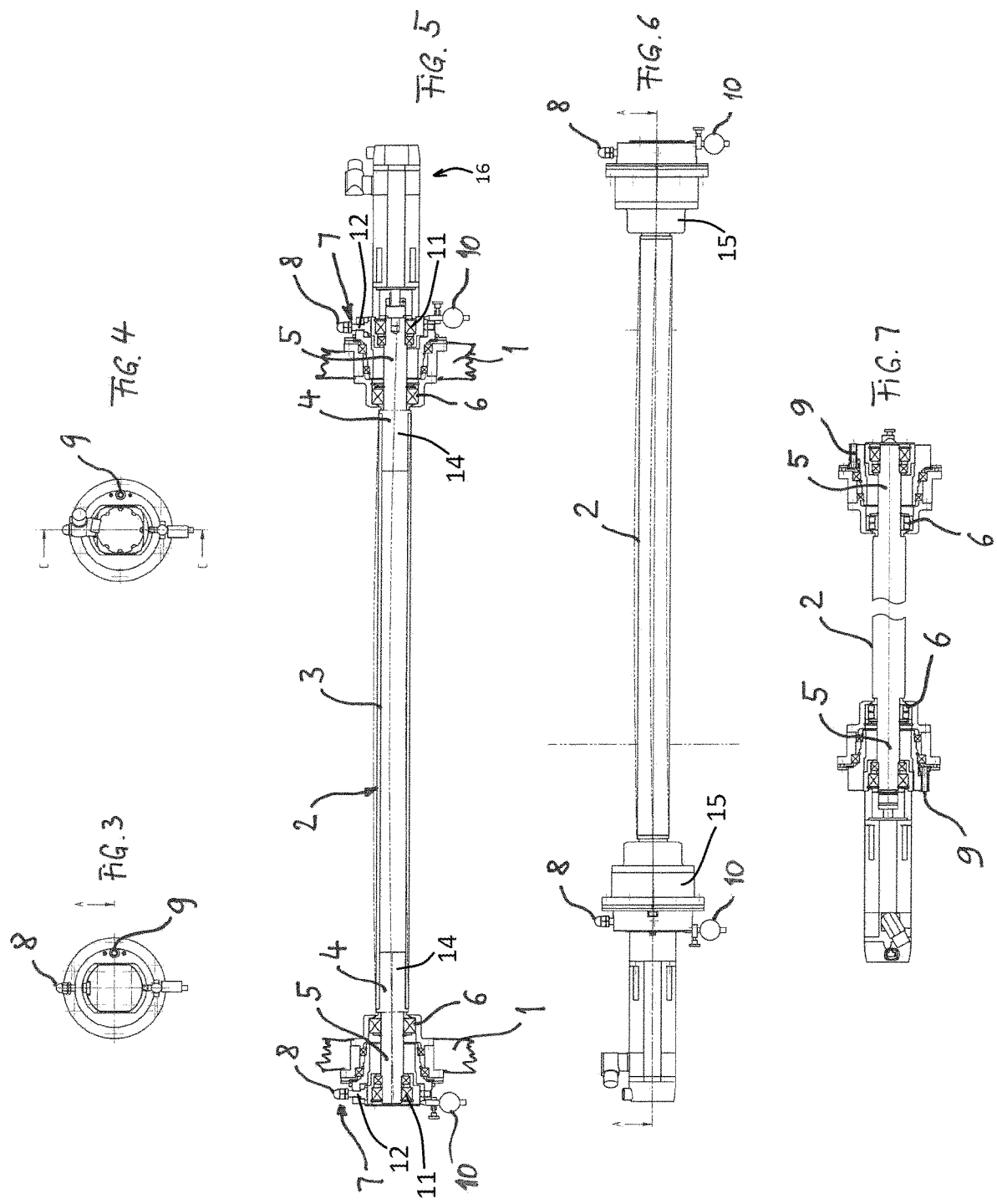

SPREADER ROLL

CROSS REFERENCE TO RELATED APPLICATIONS

This application is the US-national stage of PCT application PCT/EP2019/079870 filed 31 Oct. 2019 and claiming the priority of German patent application 102018127250.2 itself filed 31 Oct. 2018.

FIELD OF THE INVENTION

The invention relates to an apparatus with a spreader roll having a roll tube over which a material web is guided, a bending of the spreader roll relative to its longitudinal axis spreading the web width-wise with two bearing pins being fixed to the roll tube and pivotable in a machine frame.

BACKGROUND OF THE INVENTION

A generic apparatus with a spreader roll is known from DE 103 41 119. In this case, a roll tube has means for bending it. To this end, bearing pins are provided that are journaled in pivotal bearings on the machine frame. These bearings can be pivoted by an adjustment mechanism to apply a bending moment to the roll tube. The bearing pins are fitted to outer ends of the roll tube. In addition two bearings are provided for the roll tube between the bearing pins. Thus the ends of the roll tube taper and are considerably thinner than the inner bearing, so that an uneven bending moment is likely to be applied to the roll tube.

Furthermore, DE 196 01 844 describes a guide roll for a web of paper or similar material where the shaft carrying one or more individual guide rolls is bent to equalize and adjust the pressure distribution on the web.

OBJECT OF THE INVENTION

The object of this invention is to provide an improved spreader-roll apparatus of the above-described type that avoids the above-given disadvantages.

SUMMARY OF THE INVENTION

According to the invention the bearing pins are journaled in respective pivotable inner bearings on the machine frame and have outer ends projecting axially outward past the bearings and connected to radially acting adjusters. The inner bearings are about in the axial middle of the respective bearing pins, with an inner half of each bearing pin extending inward into the spreader roll and an outer half extending outward past respective pivotal bearing. The bearing pins are each therefore supported in the respective pivotable bearing on the machine frame like a pendulum. Depending on design of the bearing pin that either rotates with the roll tube or is fixed on the machine frame to be non-rotatable, the adjusters serve for pivoting the pins. If the bearing pin rotates with the spreader roll, the adjusters engage outer bearings on the axially extending bearing pins and bear thereon. The adjusters apply a force essentially perpendicular to the longitudinal axis of the respective bearing pins so the outer end of each bearing pin is deflected and bends the roll tube. Actuation of the adjusters can be similar or different from one another.

The adjusters are advantageously rotatable angularly of the spreader roll so that the direction of deflection of the roll tube can be adjusted angularly. The adjusters are each braced against a sleeve that is pivotal in the machine frame. Angular movement of the adjusters can be done by hand, but preferably a rotary drive with large transmission ratio is provided.

The adjusters can be set such that the effective directions of the force for generating the bending moment extend parallel to one another or are offset from one another at an angle.

The adjusters for their part can each have a threaded spindle with an adjustment nut operable by hand or by a drive element.

The pivoting bearing of the bearing pin is particularly useful when the bearing pin rotates with it, and it is a self-aligning bearing, preferably a multi-row ball bearing.

The bearing pin can be carried in the roll tube by two axially spaced preferably self-aligning bearings. In that case, the roll tube has its own rotary drive. The roll tube preferably has a wall thickness that is constant throughout its length.

The bearing pins can, however, also be fixed in a force fit in the roll tube. Then the drive of the roll can be done via one of the bearing pins.

In a further embodiment of the invention the bearing pins are part of a shaft on which the roll tube is guided or the shaft itself actually forms the roll tube.

In a further development of the invention, a sensor is provided for determining the bending of the roll tube at the location of the adjuster. By measuring the bending of the roll tube can be prevented by a corresponding controller operating with or without feed back to operate the rotary twisting means to adjust the bending or, for example, can be controlled during an ongoing operation to maintain bending constant as much as possible.

BRIEF DESCRIPTION OF THE DRAWING

An embodiment of the invention is shown in simplified form in the drawings. Therein:

FIG. 3 is an end view of an apparatus with a spreader roll of modified design, FIG. 4 is an end view opposite that of FIG. 3, FIG. 5 is a section through the apparatus according to line V-V, FIG. 6 is a side view of an apparatus with a spreader roll, and FIG. 7 is a section through the apparatus according to line VI-VI of FIG. 6.

SPECIFIC DESCRIPTION OF THE INVENTION

Figure 1:
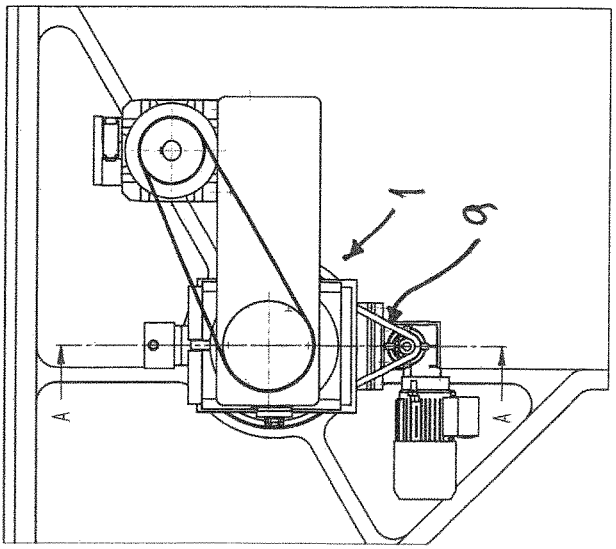
FIG. 1 is a side view of an apparatus with a spreader roll.
Figure 2:
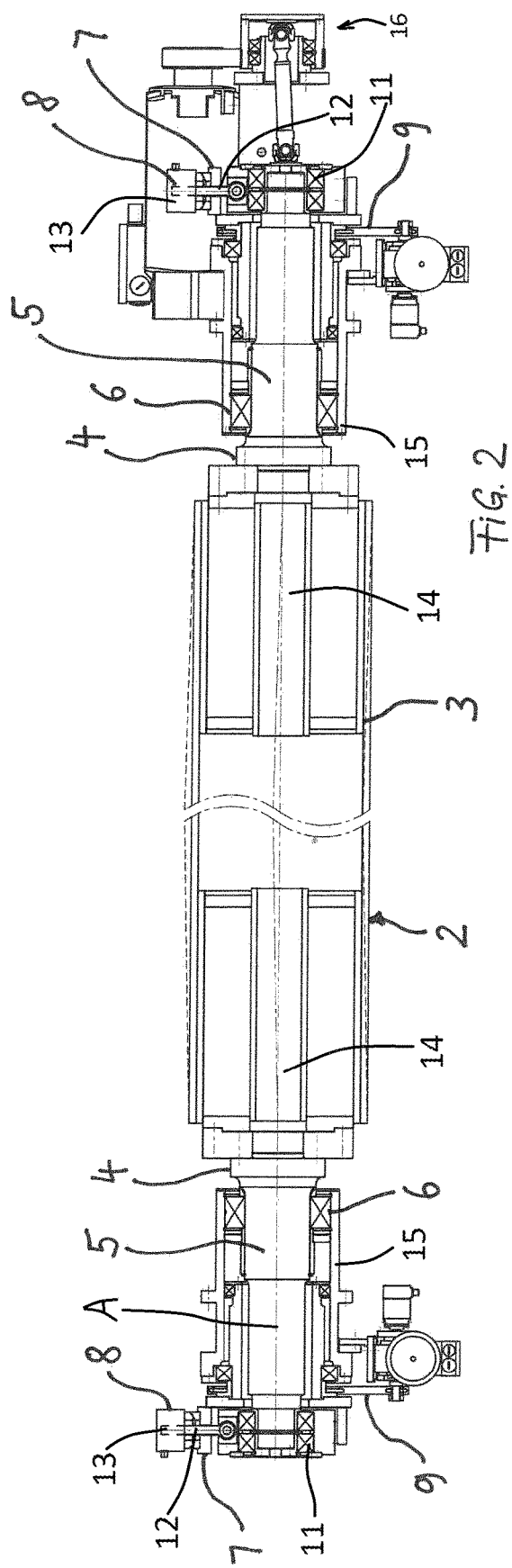
FIG. 2 is a section through the apparatus and the spreader roll along axis A of FIG. 1.

FIGS. 1 to 7, as far as shown in detail, illustrate a machine frame 1 holding and supporting a spreader roll 2 rotatable about its center axis A by a drive 16. The spreader roll 2 has a tube 3 with ends secured in respective bearing pins 4. Outer ends 5 of the bearing pins 4 project axially from respective ends of the tube 2 and are journaled approximately in their axial middles in the machine frame 1 in respective pivotal inner bearings 6. The outer ends 5 of the bearing pins 4 are seated in outer bearings 11 and are engaged radially by respective adjusters 7 for pivoting. The adjusters 7 each comprise a threaded spindle 12 with an adjustment nut 8 supported in turn on a sleeve 15 pivotably mounted in the machine frame 1 and holding the respective bearing 6. The nut 8 can be operated by hand or by a drive 13. Rotating the sleeve 15 together with the adjuster 7 by a rotary drive 9 can change the direction in which the bearing pins 4 are pivoted and thus the direction of bend of the roll tube 3. Position sensors 10 are provided for detecting deflection of the pins 4 and form part of a controller or control means.

The roll tube 3 can be supported on each of the bearing pins 4 by two axially spaced bearings. The roll tube 3 is in this case driven by an independent drive. When the bearing pins 4 are fixed in the roll tube 3 as shown in FIGS. 5 to 7, the same drive rotates both the bearing pins 4 and the roll tube 3.

The bearing pins 4 can, as shown in FIGS. 6 and 7, be parts of a shaft 14 on which the roll tube 3 is fixed. It is also possible that the shaft 14 itself forms the roll tube 3.

The invention claimed is:

1. An apparatus comprising:
   a machine frame;
   a spreader roll having a roll tube over which a material web is guided so that bending of the spreader roll relative to its longitudinal axis can spread the web width-wise;
   respective bearing pins fixed in ends of the roll tube and projecting axially outwardly therefrom;
   respective sleeves pivotable about the axis in the frame and surrounding the bearing pins;
   respective inner bearings in the sleeves, pivotable therewith on the machine frame, and in which the bearing pins are journaled, the bearing pins having axially outer ends projecting axially outward past the respective inner bearings;
   respective outer bearings on the outer ends of the pins offset axially outward from the respective inner bearings;
   respective radially acting adjusters braced radially between the sleeves and the respective outer bearings for bending the roll; and
   rotary drive means for moving the sleeves and adjusters angularly of the frame for adjustment of an angular position of bend of the roll.

2. The apparatus according to claim 1, wherein the adjusters each have a threaded spindle with an adjustment nut.

3. The apparatus according to claim 2, wherein the adjustment nut has a rotary drive.

4. The apparatus according to claim 1, wherein the pivotable bearings are self-aligning multi-row ball bearings each approximately in an axial center of the respective bearing pin.

5. The apparatus according to claim 1, wherein the bearing pins are each supported in the roll tube by two respective axially spaced self-aligning bearings.

6. The apparatus according to claim 1, wherein the bearing pins are fixed in the roll tube.

7. The apparatus according to claim 1, wherein the bearing pins are part of a shaft carrying the roll tube.

8. The apparatus according to claim 1, wherein the adjusters with regard to the effective direction of the force for generating the bending moment extend parallel or at an angle to one another.

9. The apparatus according to claim 1, further comprising:
   a sensor for determining bending of the roll tube at the adjusters.

\* \* \* \* \*